Aug. 14, 1962  H. E. RIORDAN  3,049,189
MECHANICAL FILTER
Filed Feb. 9, 1956  2 Sheets-Sheet 1

HUGH E. RIORDAN
INVENTOR

BY
ATTORNEYS

Aug. 14, 1962  H. E. RIORDAN  3,049,189
MECHANICAL FILTER
Filed Feb. 9, 1956  2 Sheets-Sheet 2

HUGH E. RIORDAN
INVENTOR

United States Patent Office 3,049,189
Patented Aug. 14, 1962

3,049,189
MECHANICAL FILTER
Hugh E. Riordan, Silver Spring, Md., assignor to the United States of America as represented by the Secretary of the Navy
Filed Feb. 9, 1956, Ser. No. 564,597
6 Claims. (Cl. 181—.5)

The present invention relates to a mechanical filter. In more detail, it relates to a mechanical filter for eliminating undesired sinusoidal oscillations in a mechanical control system.

The mechanical filter of the present invention is analogous to electrical circuits devised for a similar purpose. When undesired oscillatory currents are present in an electrical system, a filter comprising circuit elements such as capacitors, inductances and resistors is connected into the system to eliminate the undesired oscillations.

Closed loop mechanical servo systems are used as positioning devices to actuate the wings, jet vanes, or other aerodynamic surfaces used for controlling a missile in flight. A typical system of this kind includes a gyroscope which provides a signal indicating the position of the missile with respect to one of its axes, a torque amplifier which provides the necessary energy to actuate the control surfaces, and a feedback path. In general, these elements are sufficient to form a self-regulating device. However, such a device might fail to function as a result of oscillations in the loop.

It is therefore an object of the present invention to provide a filter for attenuating mechanical oscillations occurring within a particular band of frequencies.

Another object of the present invention is to provide a filter capable of completely absorbing mechanical oscillations of a predetermined frequency and transmitting with little or no attenuation oscillations of other frequencies.

It is a further object of the present invention to provide a mechanical filter that may be inserted in a closed loop mechanical servo system to eliminate oscillations of the system at unwanted frequencies.

Still another and more specific object of this invention is to provide a mechanical filter which may be connected into a mechanical guided missile control system to eliminate undesired oscillations so that the system will follow the signal from the gyroscope and properly position the vane surfaces which steer the missile.

Other objects and many of the attendant advantages of the present invention will be readily appreciated as the same becomes better understood by reference to the following detailed description when considered in connection with the accompanying drawings, wherein.

Figure 1:
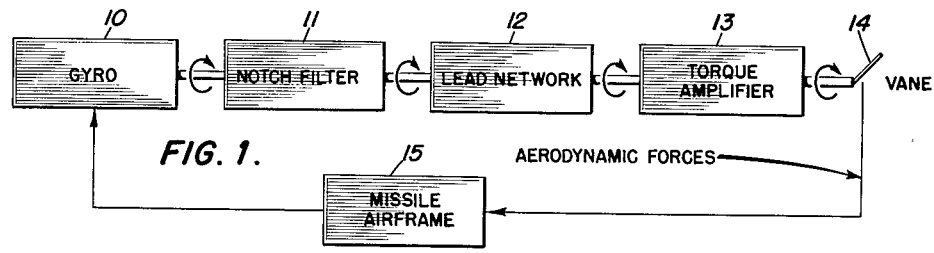
FIG. 1 is a block diagram of a control system incorporating a mechanical filter.

The mechanical steering system utilizing the notch filter is illustrated in FIG. 1. The precessional forces of the gyroscope 10, which arise by a displacement of the missile from a predetermined course, are linked through a mechanical notch filter 11 to a lead network 12. The output of the lead network is amplified by the torque amplifier 13 and applied to the vanes 14. Deflection of the vanes, which are located in the jet stream, gives rise to reactionary forces which act upon the missile airframe 15. These forces cause a displacement of the missile in such a direction as to reduce the deviation of the missile from a predetermined course.

It will be understood that the description above is typical of many self-regulating devices. An analysis properly applied to such a system would disclose the likelihood of inherent instability due to time lags in the elements forming the system. Compensation for these time lags can be made by the proper adjustment of the parameters of the lead network 12, with the result that stable operation might reasonably be expected. In practice, however, performance has been otherwise. The missile airframe cannot properly be considered as a rigid body. The missile, when subjected to aerodynamic forces, deforms elastically and gives rise to vibrations in its natural mode. These vibrational displacements have the proper phase relationship with vane forces to form a regenerative system, and thus uncontrolled oscillations arise which render the steering system useless. The notch filter 11 in the forward loop of the system provides effective correction to eliminate regeneration as described above.

The transfer characteristic of a notch filter is given in the expression $$\frac{\theta_o}{\theta_i} = \frac{S^2 + 2\zeta_1 \omega S + \omega^2}{S^2 + 2\zeta_2 \omega S + \omega^2} \qquad (1)$$

where $\theta_o$ = output angle
$\theta_i$ = input angle
$S$ = differential operator d/dt
$\zeta$ = damping factor and $\zeta_1 < \zeta_2$
$\omega$ = frequency.

The amplitude response to a sinusoidal input for a network characterized by Equation 1 is very nearly unity when the frequency of the input function is either well above or well below the natural frequency $\omega$ of the filter. As the frequency of the input approaches the frequency of the filter, the amplitude of the output decreases, reaching a minimum when the input frequency is equal to the frequency of the filter. The filter is therefore said to be a notch filter. The width of the notch, or the frequencies at which the ratio of the output amplitude to the input amplitude begins to change substantially from unity, is controlled by the choice of the damping factors $\zeta_1$ and $\zeta_2$.

Figure 2:
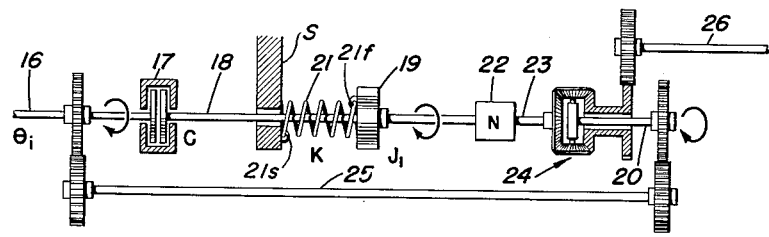
FIG. 2 is a diagrammatic illustration of a mechanical notch filter according to the present invention.

A diagram of a notch filter appears in FIG. 2. Input deflections $\theta_i$ are applied to the input shaft 16 of a viscous damper 17 which may conveniently comprise a rotor disc of light conducting material and a permanent magnet stator assembly. The output of the damper 17 appears at shaft 18. A flywheel 19 having a moment of inertia J, is formed integrally with shaft 18 and is restrained from free rotation by a torsion spring 21 having a spring constant K, one end "21s" of said spring being secured to a fixed support S, and the opposite end "21f" of said spring being secured to said flywheel 19. Oscillations of the shaft 18 are applied to a gear box 22 and appear at shaft 23 which is one input to a differential 24. The differential 24 is arranged to provide the difference between input deflections applied to shaft 23 and a second input shaft 20. The ratio of the deflection of shaft 23 to the deflection of shaft 18 is the gear box ratio N. Input deflections $\theta_i$ are applied through shaft 25 to the other input 20 of differential 24. The difference between the deflection of shaft 23 and the deflection of shaft 20 appears at shaft 26 and is the output $\theta_o$ of the filter.

It can be shown that the transfer characteristic of such an arrangement is $$\frac{\theta_o}{\theta_i} = \frac{J_1 S^2 + (1-N)CS + K}{J_1 S^2 + CS + K} \quad (2)$$

where $J$ = moment of inertia of flywheel
$K$ = spring constant
$C$ = constant associated with viscous damper.

A comparison of Equation 2 with Equation 1 yields the following facts: First, the transmission characteristics of the arrangement shown in FIG. 2 are those of a notch filter. Second, the frequency at which the notch occurs is a function of the spring constant K and the moment of inertia J. Third, the width of the notch is a function of the spring constant K, the moment of inertia J, the viscous damper constant C, and the gear ratio N.

Again referring to FIG. 2, it is well to note the operation of two of the elements, that is, the viscous damper 17, and the differential 24. The important property of the viscous damper is that forces transmitted through it are proportional to the difference in velocity of its rotor and stator shafts. The important property of the differential is its ability to measure the difference between two angular displacements.

Thus, at low input frequencies, the difference in velocities appearing across the damper 17 is small, as a consequence little force is transmitted through the damper to the flywheel 19, and since the flywheel is restrained by spring 21, it is deflected very little. The output appearing at shaft 26 of the differential 24 is the difference between the input transmitted through the parallel path 25 and the deflection of the shaft 23. It has been shown that the deflection of the flywheel shaft 18, and hence shaft 23, at low frequencies will be negligible, hence the output is equal to the input.

At high input frequencies the force transmitted through the damper 17 is considerable. However, in this case the flywheel is incapable of responding to the transmitted forces because of its inertial properties. Again, as in the case of low frequencies, the output is equal to the input.

At intermediate frequencies flywheel 19 and spring 21 behave as a torsional pendulum, the amplitude of the deflections of the shaft 23 increasing as the input frequencies approach the resonant frequency of the flywheel-spring combination. Correspondingly, variations in the phase of the deflections of shaft 23 occur until finally at resonance the deflections of the two shafts 23 and 25 are matched and occur substantially simultaneously, whereby the deflections of said shafts are in phase, and the difference of the deflections of shaft 23 and shaft 25 is at a minimum. Thus input frequencies which excite flywheel resonance define the location of the notch in the amplitude response of the filter shown in FIG. 2. It should be noted that this arrangement requires both the damper rotor and stator to be rotatable relative to a fixed reference. Usually, the damper rotor possesses a high moment of inertia and an upper limitation is thereby imposed upon the notch frequency of the filter.

Figure 3:
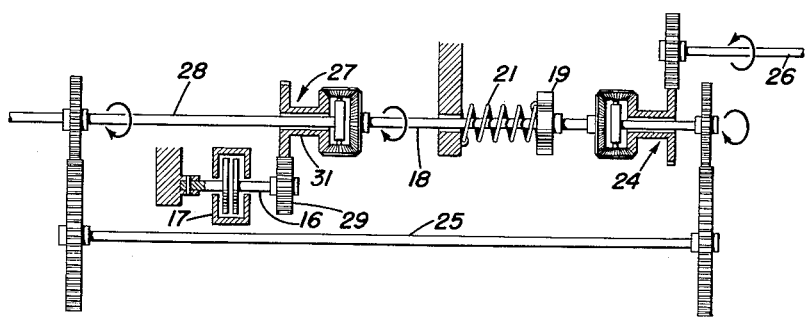
FIG. 3 is a similar illustration of a modification of the filter.

FIG. 3 illustrates an improved configuration of the filter in FIG. 2 which overcomes the foregoing limitation by the addition of a second differential 27. The differential 27 now occupies a position similar to the location of damper 17 in FIG. 2. Input deflections $\theta_i$ are applied to shaft 28 of differential 27. The rotor shaft 16 of damper 17 is coupled through gears 29 to the other input shaft 31 of differential 27. The difference shaft of differential 27 is coupled directly to shaft 18. With the exception of the relocation of the damper, as just described, the filter is otherwise similar to the filter shown in FIG. 2. However, the present arrangement possesses a distinct advantage over the preceding arrangement in that one shaft of the damper 17 may be fixed while still preserving the output-input characteristics desired. The fixed damper shaft is, of course, the heavy magnet assembly of the damper, while the movable shaft is the light rotor assembly.

Figure 4:
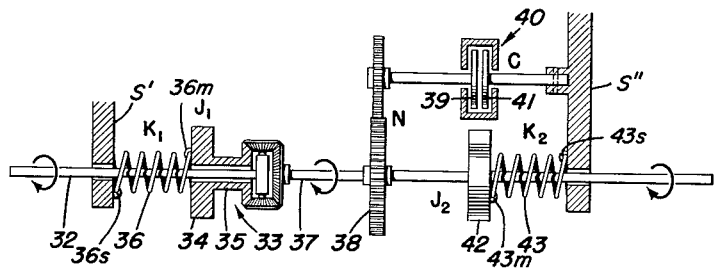
FIG. 4 is a diagrammatic illustration of a second modification of the mechanical filter providing a notch having theoretically infinite depth.

A filter theoretically having zero output at its natural frequency is shown in FIG. 4. This filter has the advantage of the elimination of the additional differential 27 appearing in FIG. 3, at the expense, however, of being liable to saturation with large input amplitudes.

Input deflections $\theta_i$ are coupled to shaft 32 of differential 33. A mass 34, having moment of inertia $J_1$, is coupled to the second input shaft 35 of a differential 33. A torsion spring 36, having a spring constant $K_1$, is fixed at one end $36s$ to a fixed support S', and has its opposite end $36m$ attached to mass 34. The combination of mass 34 and spring 36 forms a torsion pendulum having a resonant frequency $$\omega = \sqrt{\frac{K_1}{J_1}}$$

The output shaft 37 of differential 33 is coupled by gears 38 having a ratio N to the rotor 39 of an eddy current damper 40 similar to damper 17. The stator 41 of damper 40 is fixed.

The output $\theta_o$ of the filter appears at shaft 37, and formed integral with shaft 37 is a mass 42, having a moment of inertia $J_2$. Mass 42 is restrained by a torsion spring 43, having a spring constant $K_2$. One end $43m$ of spring 43 is attached to mass 42 and its opposite end $43s$ is attached to a fixed support S''. The combination of mass 42 and spring 43 comprises a second torsion pendulum having a resonant frequency $$\omega_2 = \sqrt{\frac{K_2}{J_2}}$$

The operation of the filter illustrated in FIG. 4 involves the cooperation of two mechanically resonant systems, i.e., the two torsion pendulums. The first torsion pendulum provides a means for absorbing the input deflections at the natural frequency of the pendulum. The second torsion pendulum provides a means of preventing extreme magnification of input deflections which would otherwise appear at the output when the input frequencies are higher than the natural frequency of the filter. As will be recognized by those familiar with the equations stated hereinafter, torsion pendulums having different resonant frequencies may be employed, thereby presenting an opportunity for controlling the shape of the filter characteristic curve. A more complete understanding of the operation of the filter can be gained by a consideration of the equations of motion associated with the filter.

Torques $T_1$, $T_2$, and $T_3$ acting upon shafts 32, 35 and 37, respectively, of differential 33 are related to each other in the following manner:

$$T_1 = -(T_2 + T_3) \quad (3)$$

and $$T_2 = T_3 \quad (4)$$

The angular displacements $\theta_i$, $\theta_1$ and $\theta_o$ of shafts 32, 35 and 37, respectively, are related in the following manner:

$$\theta_o = 2\theta_1 - \theta_i \quad (5)$$

The motion of flywheel 34 is described by the equation $$J_1 \frac{d^2}{dt^2}\theta_1 + K_1\theta_1 = -T_2 \quad (6)$$

where $J_1$ is the moment of inertia of flywheel 34 and $K_1$ is the spring constant of spring 36.

The motion of flywheel 42 is described by the equation.

$$J_2 \frac{d^2}{dt^2}\theta_o + N^2 C \frac{d\theta_o}{dt} + K_1\theta_o = -T_3 \quad (7)$$

where $J_2$ is the moment of inertia of flywheel 42, N is the ratio of the gears 38, $K_2$ is the spring constant of spring 43 and C is a constant associated with damper 40.

By substituting in and rearranging Equations 3 through 7 and writing S for the differential operator $$\frac{d}{dt}$$

the following is obtained:

$$2\theta_i(S^2 J_1 + K_1) = \theta_0 S^2(J_1 + J_2) + N^2 CS + (K_1 + K_2) \quad (8)$$

It is evident, from the right hand side of Equation 8, that the frequency of the output of the filter is not a function of the individual properties $J_2$ and $K_2$, of the flywheel 42 and spring 43 combination alone, but includes the properties, $J_1$ and $K_1$, of flywheel 34 and spring 36. In order for the assembly shown in FIG. 4 to comprise a symmetrical notch filter as described by Equation 1, the condition $$\frac{K_1 + K_2}{J_1 + J_2} = \frac{K_1}{J_1} \omega^2 \quad (9)$$

must prevail.

Figure 6:
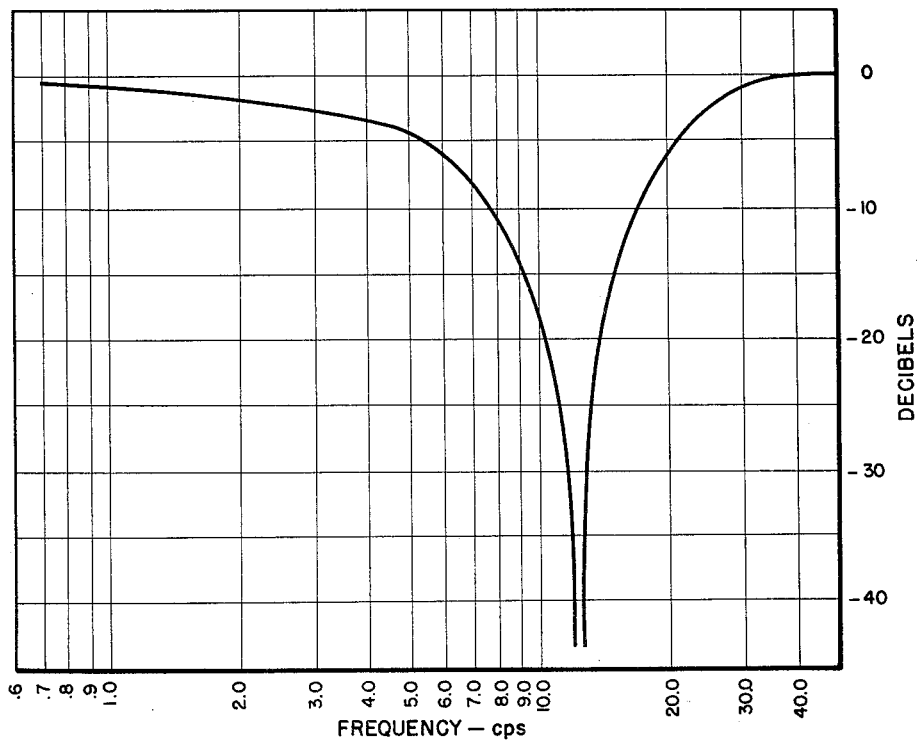
FIG. 6 is a plot of the amplitude response obtainable with the filter shown in FIG. 4.

The arrangement of FIG. 4 provides a filter in which the entire input at the resonant frequency is absorbed. The transfer characteristic plotted logarithmically, as in FIG. 6, therefore exhibits a notch of infinite depth.

A third modification of the basic filter of FIG. 2 provides a transfer characteristic conforming with the transfer characteristic defined by Equation 1. The third modification is illustrated in FIG. 5.

Input deflections $\theta_i$ are applied to an input shaft 51 of a differential 52. The second input shaft 53 of differential 52 is secured to a flywheel 54, having a moment of inertia $J_1$. Flywheel 54 is coupled to input shaft 51 by a torsion spring 55, one end 55s of said spring being attached to said shaft 51, and the other end 55f thereof being attached to said flywheel. Gears 56, having a ratio N, couple the oscillations of flywheel 54 to the rotor 39 of a damper 40 having a constant $C_1$. The stator assembly 41 of damper 40 is fixed.

A second flywheel 57 is secured to the output shaft 58 so as to rotate therewith. The rotor 59 of a second damper 61 having a constant $C_2$ is coupled to flywheel 57 through gears 62 having a ratio $N_2$. The stator 63 of damper 61 is fixed.

Figure 5:
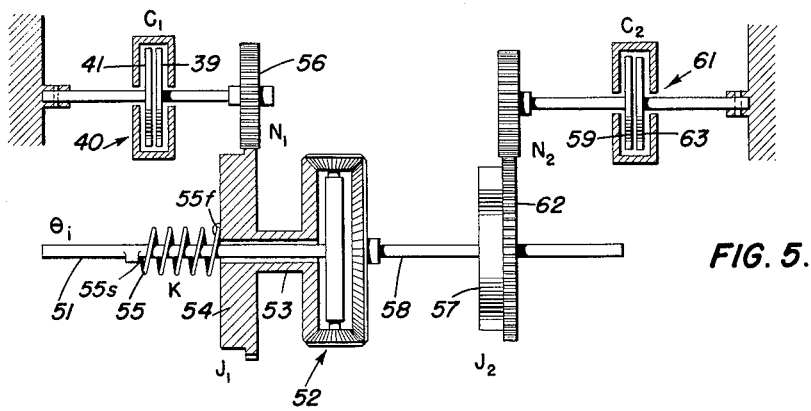
FIG. 5 is a diagrammatic illustration of a third modification of the filter having a different attenuation characteristic from the filter of FIG. 4.

The transfer function of the filter of FIG. 5 can be shown to be $$\frac{\theta_o}{\theta_i} = \frac{S^2 2J_1 + S 2 N_2 C_1 + K}{S^2(J_1 + J_2) + S(N_1^2 C_1 + N_2^2 C_2) + K} \quad (10)$$

If $J_1$ is made equal to $J_2$, Equation 10 becomes identical to Equation 1, the frequency being $$\omega = \sqrt{\frac{K}{2J_1}}$$

and the damping factors being $$\zeta_1 = \frac{N_1^2 C_1}{\sqrt{\frac{KJ_1}{2}}}$$

and $$\zeta_2 = \frac{(N_1^2 C_1 + N_2^2 C_2)}{\sqrt{2KJ_1}}$$

The arrangement of FIG. 5 therefore provides a filter in which a choice is presented as to the depth of the transfer characteristic notch, as opposed to the filter of FIG. 4 in which the notch is of infinite depth.

Obviously many modifications and variations of the present invention are possible in the light of the above teachings. It is therefore to be understood that within the scope of the appended claims the invention may be practiced otherwise than as specifically described.

What is claimed is:

1. A mechanical filter comprising, a differential including a first input shaft, a second input shaft and an output shaft operatively associated with each of said input shafts, said first input shaft receiving the mechanical oscillations to be filtered, a torsion pendulum rigidly secured to said second input shaft and resiliently secured to said first input shaft so that said pendulum oscillates relative to said first input shaft, a flywheel secured to said output shaft, and means connected with said flywheel for damping the motion of said flywheel and said output shaft.

2. A filter as claimed in claim 1, with additionally means connected with said torsion pendulum for damping the motion thereof.

3. A mechanical oscillation notch filter comprising, a differential including a first shaft for transmitting angular displacements and torques, a second shaft for transmitting angular displacements and torques and a third shaft, operatively associated with said first and said second shafts, for transmitting angular displacements constituting the difference between the displacements of said first and second shafts, said first shaft receiving the mechanical oscillations to be filtered, a first torsion pendulum mounted on and receiving torque from said second shaft, a second torsion pendulum mounted on and receiving torque from said third shaft, means operatively connected with said third shaft for damping the motion of said second torsion pendulum, said first and second pendulums having resonant frequencies of such magnitude that the entire input to the filter of mechanical oscillations having a frequency equal to the resonant frequency of said filter will be absorbed thereby.

4. A mechanical oscillation filter comprising, a differential including a first input shaft, a second input shaft, and an output shaft operatively associated with each of said input shafts, one of said input shafts receiving mechanical oscillations to be filtered, a torsion pendulum operatively connected to the other of said input shafts for establishing the oscillation frequencies to be filtered out by said filter, said pendulum including a mass and a resilient means, said mass being coupled to said other input shaft and said resilient means being secured at one end thereof to said mass and at the other end thereof to a point removed from said mass, said mass being rotatable with respect to said point, said differential acting to compare the motion of said pendulum with the motion of said shaft receiving the mechanical oscillations and to transmit the resultant difference between said motions to said output shaft, and damping means operatively connected with one of said shafts.

5. A filter as claimed in claim 4, including additionally a second torsion pendulum operatively connected to said output shaft, said second pendulum including a mass and a resilient means, said mass of said second pendulum being secured to said output shaft and said resilient means of said second pendulum being secured at one end thereof to said mass of said second pendulum and at the other end thereof to a point removed from said mass of said second pendulum, said mass of said second pendulum being rotatable with respect to said point, said second pendulum acting to prevent extreme magnification of mechanical oscillations transferred to said output shaft by said differential when the frequencies of such oscillations are higher than said aforementioned frequencies to be filtered out.

6. A filter as claimed in claim 4, wherein said damping means is operatively connected to said output shaft, and including additionally a second damping means operatively connected with said mass of said pendulum for damping the motion thereof.

References Cited in the file of this patent

UNITED STATES PATENTS

| | | |
|---|---|---|
| 1,681,554 | Norton | Aug. 21, 1928 |
| 2,126,855 | Wunsch et al. | Aug. 16, 1938 |
| 2,283,753 | Harcum | May 19, 1942 |
| 2,333,122 | Prescott | Nov. 2, 1943 |
| 2,473,335 | Hardy | June 14, 1949 |